United States Patent
Cozzolino

(10) Patent No.: US 11,107,340 B1
(45) Date of Patent: Aug. 31, 2021

(54) AUTOMOBILE CHILD ALERT WARNING SYSTEM

(71) Applicant: Joseph John Cozzolino, Hackettstown, NJ (US)

(72) Inventor: Joseph John Cozzolino, Hackettstown, NJ (US)

( * ) Notice: Subject to any disclaimer, the term of this patent is extended or adjusted under 35 U.S.C. 154(b) by 0 days.

(21) Appl. No.: 16/873,850

(22) Filed: Jul. 28, 2020

(51) Int. Cl.
| | |
|---|---|
| *B60Q 1/00* | (2006.01) |
| *G08B 21/02* | (2006.01) |
| *B60Q 9/00* | (2006.01) |
| *B60H 1/00* | (2006.01) |
| *G08B 21/22* | (2006.01) |
| *G08B 21/24* | (2006.01) |

(52) U.S. Cl.
CPC ......... *G08B 21/02* (2013.01); *B60H 1/00742* (2013.01); *B60Q 9/00* (2013.01); *G08B 21/22* (2013.01); *G08B 21/24* (2013.01)

(58) Field of Classification Search
CPC ........ G08B 21/02; G08B 21/22; G08B 21/24; B60Q 9/00; B60H 1/00742; B60N 2/28; B60N 2/002; B60N 2/26; B60N 2/879; B60R 99/00; B60K 37/02; B60K 35/00; B60K 2370/178; B60W 2050/143; B60W 2040/0881
USPC ... 340/438, 457, 425.5, 693.1, 693.2, 693.3, 340/693.4, 693.5, 901, 321, 691.1
See application file for complete search history.

(56) References Cited

U.S. PATENT DOCUMENTS

| | | | |
|---|---|---|---|
| 7,250,869 B2 | 7/2007 | Davis | |
| 7,348,889 B2* | 3/2008 | Monzo | B60N 2/002 180/273 |
| 8,063,758 B1* | 11/2011 | Mohan | B60Q 9/00 340/457 |
| 9,403,437 B1 | 8/2016 | McDonald et al. | |
| 9,796,303 B1* | 10/2017 | Schonfeld | B60N 2/2812 |
| 9,849,728 B2* | 12/2017 | Alfaro Fonseca | B60N 2/002 |
| 10,023,116 B2* | 7/2018 | Rovinsky | G08B 21/24 |

* cited by examiner

*Primary Examiner* — Anh V La
(74) *Attorney, Agent, or Firm* — Kattina V. Barsik, Esq.

(57) ABSTRACT

An automobile child alert warning system that will prevent young children, babies, and, pets from dying as a result of being left alone in hot locked automobiles. The system includes a warning light, a recording mechanism, a time delay provision, a speaker, and a visual and verbal warning message that alerts driver to make sure everyone has vacated from the vehicle at the end of the trip. This system may be built into a dashboard of the automobile during the manufacturing process. Preferably, the warning light will protrude through the speedometer or be placed adjacent to it. The speedometer location is the ideal location for this warning device because speedometers are usually located directly in front of the driver. In actuality, all that will be visible of this device will be the red warning light. The rest of the components will be hidden behind the dashboard.

6 Claims, 2 Drawing Sheets

AUTOMOBILE CHILD ALERT WARNING SYSTEM

BACKGROUND OF THE INVENTION

1. Field of the Invention

The present invention relates generally to warning devices and more specifically to an automobile child alert warning system specifically designed to prevent the deaths of small children, babies, and pets, who get trapped in hot, locked automobiles.

2. Description of the Prior Art

Attempts have been made by various people to address this serious problem, but the solutions offered were not practical, cost effective or simple to implement. These solutions required the owner of the vehicle to purchase expensive seats and other equipment, sensors and monitoring devices to make the system work properly. Also, these solutions do not work automatically. Whereas, the present invention is totally automatic allowing the driver to drive as he or she would normally drive the automobile without the warning system in it. Conclusions by experts considering these type devices currently available are inconsistent and unreliable in their performance requiring too much effort from the driver to operate correctly.

In many respects the present invention substantially departs from the existing concepts and designs of the prior art and in so doing provides an apparatus primarily developed for accomplishing the specific tasks it was designed for automatically, whereas nothing happens automatically with the prior art.

SUMMARY OF THE INVENTION

In view of the foregoing disadvantages inherent in the prior art, the present invention provides a new automatic system for solving the problem of saving many lives each year who die from heat stroke as a result of being trapped in hot locked automobiles.

The general purpose of the present invention, which will be described subsequently in greater detail is to provide a new safety alert warning system that has many advantages over the prior art which is not anticipated, rendered obvious, suggested or even implied by any of the prior art solutions either alone or in any combination thereof.

To attain this, the present invention generally comprises a housing which contains a recording device with a play back feature, a timing device, a warning light, a speaker and the ability for providing a written and verbal message from the face of the speedometer on the dashboard of the vehicle.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an automatic child alert warning system that reminds the driver to check the vehicle, before vacating it, to make sure everyone has left.

A second object is to provide an automatic car warning system that is completely automatic and does not require driver to perform extra functions for it to work as designed.

Another object is to provide an automatic car warning system that is simple and easy to use.

An additional object is to provide a child alert car warning system that is built into the automobile during the manufacturing of the automobile.

Another object is to provide a simple and easy to use system that does not require driver to do any monitoring of the system when driving the vehicle.

Other objects and advantages of the present invention will become obvious to the reader and it is intended that these objects and advantages are within the scope of the present invention.

In view of the above objects, the present disclosure provides an automobile child alert warning system, comprising: a housing containing readily available and reliable proven off the shelf components, available at most electrical/electronic specialty stores;

The components are described as: a recording device with a pre-recorded message on it with play-back capabilities.

Further components are described as: a small warning-light.

Further components are described as: a small speaker.

Further components are described as: a time delay device for controlling when to turn on and to turn off the automatic warning system.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

BRIEF DESCRIPTION

Figure 1:
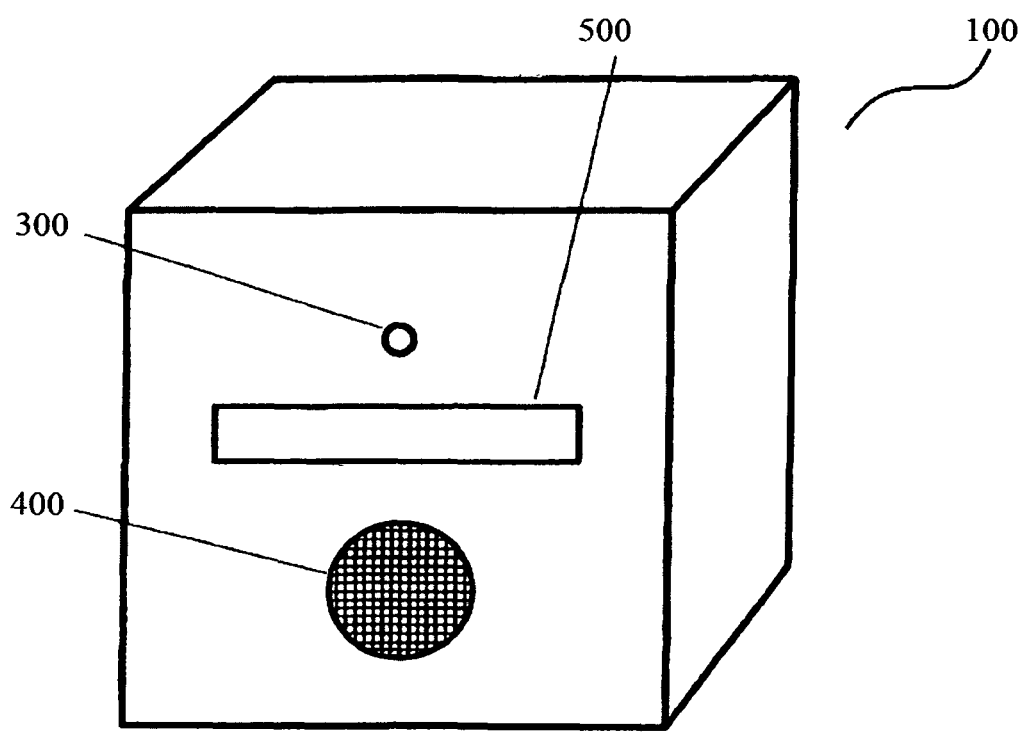
FIG. 1 is a view of the housing, which is secured to the inside of the dashboard, in accordance to an exemplary embodiment of the present disclosure.

FIG. 1 illustrates a housing 100, which may be secured to inside of a dashboard.

Figure 2:
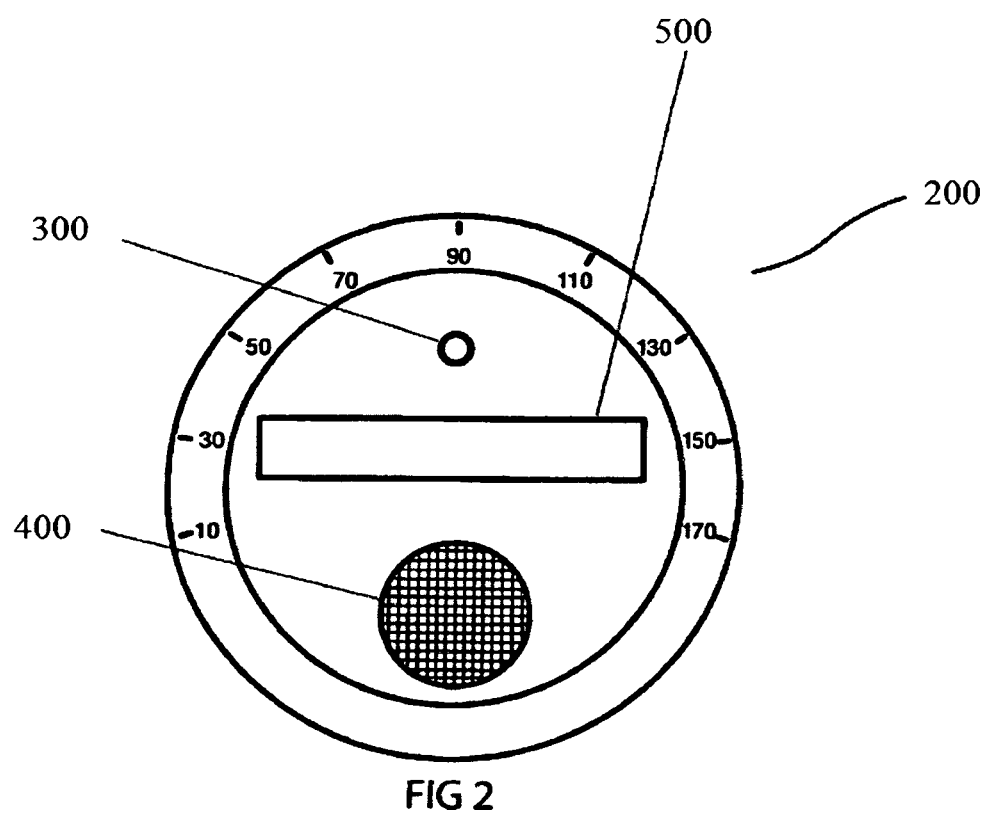
FIG. 2 is an illustration of the face of the speedometer, in accordance to an exemplary embodiment of the present disclosure.

FIG. 2 illustrates a speedometer 200.

As shown in FIGS. 1 and 2 a warning light 300 will be located on the inside of the housing 100 and on the face of the speedometer 200 or adjacent to the speedometer 200.

As shown in FIGS. 1 and 2, a speaker 400 will be located.

Further, as shown in FIGS. 1 and 2—locations 500 where a blinking, verbal, and visual message will appear. Message will remind driver to make sure, everyone, especially children are out of the vehicle before leaving and locking it. This message automatically begins just after driver turns off the ignition and then automatically shuts off.

There are two components of the present invention which cannot be seen because they will be enclosed in the housing 100 which will be located inside the dashboard. Those two components are the recording device (not shown) with a pre-recorded message on it plus a timing device (not shown) which turns a warning system (not shown) on and then turns it off at pre-arranged times during a cycle. The cycle is the period from when the ignition is turned on to the time when it is turned off. Additionally, the housing 100 will also contain two other components. They are the speaker 400 and the warning light 300. The warning light 300 will be the only item of the housing 100 that will protrude through the dashboard/speedometer and be visible.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The best way to describe a cycle is to illustrate what a person experiences driving a car equipped with an Automobile Child Alert Warning System in it.

1. Subject enters the automobile and turns on the ignition. At this point the warning system is activated and a red warning light on the dashboard lights up, red in color.

2. The driver begins to drive, as he or she normally would, and nothing happens up to this point.

3. Driver arrives at destination and then turns off the ignition. It is at this point that the Automobile Child Alert Warning System gets active. Immediately after the ignition is turned off, the red warning light on the dashboard begins to blink on and off. At the same time, a beeping warning sound begins to make the driver more alert to listen to the verbal message and to view the same visual message located on the face of the speedometer. The message reminds the driver to make sure everyone leaves the automobile before leaving and locking it. After the message is repeated, the system is de-activated and shuts down. This simple automatic warning system will save the lives of the many small children, babies and pets who die from heat stroke each year because they were left all alone in hot locked cars.

What is claimed is:

1. An automobile child alert warning system for an automobile having a dashboard and a speedometer, the automobile child alert warning system comprising:
   a housing to be secured to an inside of the dashboard of the automobile;
   a warning system provided jointly in the housing and behind the speedometer, the warning system comprising a warning light, a speaker and a display;
   a time delay device enclosed within the housing to control the warning system based on a cycle, wherein the cycle starts when ignition of the automobile is turned on and the cycle stops after a prearranged time after the ignition of the automobile is turned off and stops, and wherein, during the cycle, the automobile child alert warning system is configured to:
      activate the warning system to turn on the warning light, as soon as the ignition of the automobile is turned on,
      activate blinking on and off the warning light, and at the same time, a beeping warning sound via the speaker begins to make a driver of the automobile more alert to listen to a verbal message and to view a visual message on the display, immediately after the ignition is turned off and up to the prearranged time after the ignition is turned off.

2. The automobile child alert warning system of claim 1 further comprising a recording device with a pre-recorded message having play-back capabilities to play via the speaker.

3. The automobile child alert warning system of claim 1, wherein the warning light located on the face of the speedometer and protruding through the dashboard to be visible.

4. The automobile child alert warning system of claim 1, wherein the speaker located in the housing and a visual message protruding through on the face of the speedometer.

5. The automobile child alert warning system of claim 1, wherein the time delay device controls when the visual and verbal message is turned on and off.

6. An automobile child alert warning method for an automobile having a dashboard and a speedometer, the automobile child alert warning method comprising:
   controlling a warning system based on a cycle, wherein the cycle starts when ignition of the automobile is turned on, and the cycle stops after a prearranged time when the ignition of the automobile is turned off and stops, wherein controlling of the warning system based on the cycle comprises:
      activating the warning system to turn on a warning light, as soon as the ignition of the automobile is turned on; and
      activating blinking on and off of the warning light, and at the same time, a beeping warning sound via a speaker begins to make a driver of the automobile more alert to listen to a verbal message and to view a visual message on a display, immediately after the ignition is turned off and up to the prearranged time after the ignition is turned off.

* * * * *